UNITED STATES PATENT OFFICE.

WILLIAM BLACKWELL COWELL, OF CATFORD, ENGLAND.

BITUMINOUS PAVING COMPOSITION AND PROCESS OF MAKING IT.

1,239,160.     Specification of Letters Patent.     Patented Sept. 4, 1917.

No Drawing.     Application filed January 24, 1916. Serial No. 73,873.

*To all whom it may concern:*

Be it known that I, WILLIAM BLACKWELL COWELL, a subject of the King of Great Britain, and resident of No. 28 Berlin road, Catford, in the county of Kent, England, have invented new and useful Bituminous Paving Compositions and Processes of Making Them, of which the following is a specification.

One object of the invention is to provide a material composed principally of such ingredients as coal-tar-pitch or natural bitumen and anthracene oil or the like, gypsum, chalk, French chalk, and Portland cement or the like, with certain other ingredients producing a new or improved effect in the manner hereinafter particulaly described.

According to this invention, the following ingredients are compounded namely:—

Coal-tar-pitch or natural bitumen, hereinafter referred to as hard pitch, anthacene oil and maltha, chalk or limestone, gypsum, French chalk, Portland cement or other suitable cement and acaroid resin.

It may here be stated that anthracene oil is a by-product obtained from coal tar, the specific gravity ranging from 13° to 20° Twaddell. Maltha is a semi-liquid substance between natural pitch and oil. The rest of the ingredients are well known and do not require to be further defined.

According to this invention anthracene oil and maltha are first of all mixed together in or about the proportions of nine to one and hard pitch is afterward incorporated therewith. The anthracene oil and maltha mixture and hard pitch are put into a vessel open at the top and preferably jacketed and the jacket is connected to a boiler for the supply of steam, an outlet pipe being also provided and valves for controlling the inlet and outlet of steam. The vessel may furthermore be provided with a cover adapted to closely fit thereon and with an agitator or stirring device, if desired.

The vessel is then heated so that the temperature of its contents is raised to about 100° C. and the proportions by weight of the ingredients are approximately as follows:—

| | |
|---|---|
| Maltha | 1.75 |
| Anthracene oil | 15.75 |
| Hard pitch | 26.00 |
| | 43.50 |

The combination in this mixture of anthracene oil and maltha in, approximately, the proportions mentioned, has for its object to dissolve the pitch and to render it adaptable or suitable for the absorption of the sulfur contained in the gypsum to be presently referred to. To this liquid plastic mixture is gradually added, while stirring and heating to about 150° C., a base or mixture comprising the following ingredients in, approximately, the following proportions by weight:

| | |
|---|---|
| Gypsum (calcium sulfate) | 9.50 |
| Chalk or limestone (calcium carbonate) | 19.00 |
| French chalk or talc (magnesium silicate) | 3.00 |
| | 31.50 |

Now gypsum ($CaSO_4 + 2H_2O$) contains, roughly, about 79% of calcium sulfate and 21% of water, whereas plaster of Paris ($2CaSO_4 + H_2O$) contains about 94% of calcium sulfate and 6% of water. When gypsum is heated to about 204° C., it loses about three-fourths of its combined water and becomes plaster of Paris. The object in view is to obtain by a semi-catalysis $CaSO_4 + H_2O$ or, approximately, 89% of calcium sulfate and 11% of water, thus retaining about one half instead of only about one quarter of the water, as happens when the temperature is raised to 204° C. and this is one of the reasons why the temperature used does not exceed, approximately, 150° C. Moreover by using a temperature of say 150° C., the sulfur is kept in a molten and viscous condition with the result that the elastic or resilient quality of the composition is increased.

When a predetermined quantity of the base has been added to the plastic mixture, the condition of saturation is attained and at the same time the pitch fixes the sulfur contained in the base in the allotropic form in which the sulfur is in a semi-liquid or viscous condition, provided that the temperature employed be below that required for converting the gypsum into plaster of Paris. The sulfur contained in the gypsum imparts elasticity to the pitch, similarly as in the natural bitumen pitches. The lime in the chalk and gypsum serves as a binding material and the French chalk or talc consolidates the maltha and anthracene oil in the plastic mixture, by forming therewith, a saponaceous mass.

For the purpose of absorbing the freed surplus oil present at this stage in the composition, Portland cement, slag cement or Roman cement is added and also a small proportion of Australian grass tree or yacca gum (acaroid resin) to harden the product and enable it to withstand extreme and varied climatic conditions. For these purposes the ingredients specified are added in, approximately, the following proportions:—

Portland cement, slag cement or Roman cement_____ 18.00
Acaroid resin_____ 7.00
                                    _____
                                    25.00

When the cement and acaroid resin have been uniformly distributed in the mass, the temperature is again raised to 150° C. for the purpose of insuring the intimate mixture of the ingredients. The vessel is then covered over, the steam inlet and outlet are closed and the composition is allowed to stand for, say, about one hour or two hours, during which time the convection currents keep the mass in motion and a thorough mixing is obtained.

The composition therefore, approximately comprises:—

The plastic mixture consisting of maltha, anthracene oil and pitch_____ 43.50
The base consisting of gypsum, chalk and French chalk_____ 31.50
Cement and acaroid resin_____ 25.00
                                    _____
                                    100.00

The composition may be molded or pressed into the form of sheets and these sheets are applied on the road metal of broken granite or other suitable material. The sheets may be about six feet long by three feet wide and, say, a quarter of an inch thick. The road surface is first heated to dry the stones and the sheets are then laid thereon, side by side, and end to end and heat is again applied with the result that the plastic composition is melted and sinks into the interstices between the stones. The plastic composition securely binds or cements the stones together for some distance below the surface so that the road covering, to that extent, forms one solid mass. To repair a road surface, so made, it is only necessary to apply another layer of stones to the worn parts, to roll and heat the same, to apply a sheet or sheets of the plastic composition thereto and to heat it sufficiently to cause the composition to melt and sink in between the fresh stones and on to the worn surface. Obviously, the latter may be slightly roughened with a pick or scarifier, if desired, prior to the application of the fresh layer of stones.

Or the plastic composition may be mixed, while in a heated condition with hard, finely divided or pulverulent material, such as granite chips or dust or the like in such proportions as:—

The plastic composition composed of the plastic mixture, the base, cement and acaroid resin_____ 100
Granite chips or the like_____ 100
                                    _____
                                    200 lbs.

This compound may be cast in molds in the form of blocks or slabs of the required dimensions and with overlapping sides. The blocks or slabs may be laid on a concrete or other suitable foundation and bedded in a suitable cement or in the plastic composition comprising the plastic mixture and the base, with or without the addition of cement and acaroid resin. The cement or composition, preferably thinned to the consistency of varnish, is brushed or rubbed on to the lower surface (or foundation) and sides of the blocks or slabs, before laying, thereby causing them to adhere firmly to the foundation and to each other, when laid.

What I claim as my invention and desire to secure by Letters Patent of the United States is:—

1. Process for the manufacture of a paving or surfacing composition of matter comprising the production of a plastic mixture by mixing maltha with anthracene oil and incorporating hard pitch therewith, heating the said plastic mixture to a temperature of, approximately, 100° C., incorporating with the said plastic mixture a base comprising gypsum, calcium carbonate, and magnesium silicate, while stirring and gradually raising the temperature to approximately, 150° C., adding cement, continuing the stirring, and again raising the temperature to approximately 150° C., substantially as set forth.

2. Process for the manufacture of a paving or surfacing composition comprising the production of a plastic mixture by mixing maltha with anthracene oil and incorporating hard pitch therewith, heating the said plastic mixture to a temperature of, approximately, 100° C., incorporating with the said plastic mixture a base comprising gypsum, calcium carbonate and magnesium silicate, while stirring and gradually raising the temperature to, approximately, 150° C., adding cement and gum, continuing the stirring, and again raising the temperature to, approximately, 150° C. substantially as set forth.

3. Process for the manufacture of a paving or surfacing composition comprising the production of a plastic mixture by mixing maltha with anthracene oil in, approximately, the proportions of one and three quarter parts and fifteen and three quarter parts, respectively, and incorporating, approximately, twenty six parts of hard pitch therewith, heating the said plastic mixture to, approximately, 100° C., incorporating with the said plastic mixture a base comprising, approximately, nine and a half parts of gypsum, nineteen parts of calcium carbonate and three parts of magnesium silicate, while stirring and gradually raising the temperature to approximately, 150° C., adding approximately, eighteen parts of cement and seven parts of gum and again stirring and gradually raising the temperature to, approximately, 150° C., substantially as set forth.

4. Process for the manufacture of a paving or surfacing composition comprising the production of a plastic mixture by mixing maltha with anthracene oil, and incorporating hard pitch therewith, heating the said plastic mixture in a vessel to a temperature of, approximately, 100° C., incorporating with the said plastic mixture a base comprising gypsum, calcium carbonate and magnesium silicate, while stirring and gradually raising the temperature to, approximately, 150° C., adding cement and gum, continuing the stirring, again raising the temperature to, approximately, 150° C., discontinuing the application of heat, covering the vessel and allowing the contents of the said vessel to stand for a period of, approximately, an hour and a half, during which time the convection currents keep the mass in motion, substantially as set forth.

5. Process for the manufacture of a paving or surfacing composition comprising the production of a plastic mixture by mixing maltha with anthracene oil in, approximately, the proportions of one and three quarter parts and fifteen and three quarter parts, respectively, and incorporating, approximately, twenty six parts of hard pitch therewith, heating the said plastic mixture to, approximately, 100° C., incorporating with the said mixture a base comprising, approximately, nine and a half parts of gypsum, nineteen parts of calcium carbonate and three parts of magnesium silicate, while stirring and gradually raising the temperature to, approximately, 150° C., adding, approximately, eighteen parts of cement and seven parts of gum, continuing the stirring, again raising the temperature to, approximately, 150° C., discontinuing the application of heat and covering the vessel, and allowing the contents of the said vessel to stand for a period of, approximately, an hour and a half during which time the convection currents in the mass keep it in motion, substantially as set forth.

6. Process for the manufacture of a paving or surfacing composition comprising the production of a plastic mixture by mixing maltha with anthracene oil in, approximately, the proportions of one and three quarter parts and fifteen and three quarter parts, respectively, and incorporating, approximately, twenty six parts of hard pitch therewith, heating the said plastic mixture to, approximately, 100° C., incorporating with the said plastic mixture a base comprising, approximately, nine and a half parts of gypsum, nineteen parts of calcium carbonate and three parts of magnesium silicate, while stirring and gradually raising the temperature to, approximately, 150° C., adding, approximately, eighteen parts of cement and seven parts of gum, again stirring and gradually raising the temperature to, approximately, 150° C., and molding the plastic composition into suitable form for use substantially as set forth.

7. Process for the manufacture of a paving or surfacing composition comprising the production of a plastic mixture by mixing maltha with anthracene oil in, approximately, the proportions of one and three quarter parts and fifteen and three quarter parts, respectively, and incorporating, approximately, twenty six parts of hard pitch therewith, heating the said plastic mixture to, approximately, 100° C., incorporating with the said plastic mixture a base comprising, approximately, nine and a half parts of gypsum, nineteen parts of calcium carbonate and three parts of magnesium silicate, while stirring and gradually raising the temperature to approximately, 150° C., adding, approximately, eighteen parts of cement and seven parts of gum, continuing the stirring, again raising the temperature to, approximately, 150° C., discontinuing the application of heat, covering the vessel, thereby allowing the contents of the said vessel to stand for a period of, approximately, an hour and a half during which time the convection currents keep the mass in motion and molding the plastic composition into suitable form for use, substantially as set forth.

8. Process for the manufacture of a paving or surfacing composition comprising the production of a plastic mixture by mixing maltha with anthracene oil, and incorporating hard pitch therewith, heating the said plastic mixture to a temperature of, approximately, 100° C., incorporating with the said plastic mixture a base comprising gypsum, calcium carbonate and magnesium silicate, while stirring and gradually raising the temperature to, approximately, 150° C., adding cement and acaroid gum, adding finely divided inert material and molding the composition, so produced and while in a heated condition, into blocks, substantially as set forth.

9. Process for the manufacture of a paving or surfacing composition comprising the production of a plastic mixture by mixing maltha with anthracene oil and incorporating hard pitch therewith, heating the said plastic mixture in a vessel to a temperature of, approximately, 100° C., incorporating with the said plastic mixture a base comprising gypsum, calcium carbonate and magnesium silicate, while stirring and gradually raising the temperature to, approximately, 150° C., adding cement and gum, continuing the stirring, again raising the temperature to, approximately, 150° C., discontinuing the application of heat and covering the vessel, and allowing the contents of the said vessel to stand for a period of, approximately, one hour and a half, during which time the convection currents keep the mass in motion, then adding finely divided inert material and molding the composition so produced, and while in a heated condition, into blocks, substantially as set forth.

10. Process for the manufacture of a paving or surfacing composition comprising the production of a plastic mixture by mixing maltha with anthracene oil in, approximately the proportions of one and three quarter parts and fifteen and three quarter parts, respectively, and incorporating, approximately, twenty six parts of hard pitch therewith, heating the said plastic mixture to, approximately, 100° C., incorporating with the said plastic mixture a base comprising, approximately, nine and a half parts of gypsum, nineteen parts of calcium carbonate and three parts of magnesium silicate, while stirring and gradually raising the temperature to, aproximately, 150° C., adding, approximately, eighteen parts of cement and seven parts of gum, again stirring and gradually raising the temperature to, approximately, 150° C., discontinuing the application of heat and covering the vessel, thereby allowing the contents of the said vessel to stand for a period of, approximately, one hour and a half, during which time the convection currents keep the mass in motion, then adding finely divided inert material and molding the composition, so produced, and while in a heated condition, into blocks, substantially as set forth.

11. A paving or surfacing composition comprising maltha, anthracene oil, hard pitch, gypsum, calcium carbonate, magnesium silicate and cement.

12. A paving or surfacing composition, comprising maltha, anthracene oil, hard pitch, gypsum, calcium carbonate, magnesium silicate, cement, and gum.

13. A paving or surfacing composition comprising approximately one and three quarter parts of maltha, fifteen and three quarter parts anthracene oil, twenty six parts of hard pitch, nine and a half parts of gypsum, nineteen parts calcium carbonate, three parts of magnesium silicate, eighteen parts of cement, and seven parts of acaroid resin.

14. A paving or surfacing composition comprising maltha, anthracene oil, hard pitch, gypsum, calcium carbonate, magnesium silicate, cement, gum, and comminuted stone.

15. A paving or surfacing composition comprising approximately one and three quarter parts of maltha, fifteen and three quarter parts of anthracene oil, twenty six parts of hard pitch, nine and one half parts of gypsum, nineteen parts calcium carbonate, three parts of magnesium silicate, eighteen parts of cement, seven parts of acaroid resin, and one hundred parts of comminuted stone.

WILLIAM BLACKWELL COWELL.